(12) United States Patent
An et al.

(10) Patent No.: US 11,335,925 B2
(45) Date of Patent: May 17, 2022

(54) FUEL CELL SYSTEM AND HUMIDIFIER THEREFOR

(71) Applicant: KOLON INDUSTRIES, INC., Gwacheon-si (KR)

(72) Inventors: Na Hyeon An, Yongin-si (KR); Kyoung Ju Kim, Yongin-si (KR); Woong Jeon Ahn, Yongin-si (KR); Young Seok Oh, Yongin-si (KR); Jin Hyung Lee, Yongin-si (KR)

(73) Assignees: Kolon Industries, Inc., Seoul (KR); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 426 days.

(21) Appl. No.: 15/961,974

(22) Filed: Apr. 25, 2018

(65) Prior Publication Data
US 2018/0316028 A1    Nov. 1, 2018

(30) Foreign Application Priority Data

Apr. 26, 2017  (KR) .......................... 10-2017-0053447

(51) Int. Cl.
| | | |
|---|---|---|
| *H01M 8/04119* | (2016.01) | |
| *H01M 8/04291* | (2016.01) | |
| *H01M 8/04791* | (2016.01) | |
| *H01M 8/04828* | (2016.01) | |

(52) U.S. Cl.
CPC ... *H01M 8/04149* (2013.01); *H01M 8/04141* (2013.01); *H01M 8/04291* (2013.01); *H01M 8/04805* (2013.01); *H01M 8/04828* (2013.01); *H01M 2250/20* (2013.01); *Y02T 90/40* (2013.01)

(58) Field of Classification Search
CPC ......... H01M 8/04141; H01M 8/04149; H01M 8/04828; H01M 8/04843; H01M 8/04835
See application file for complete search history.

(56) References Cited

U.S. PATENT DOCUMENTS

| | | | |
|---|---|---|---|
| 2008/0113230 A1* | 5/2008 | Whyatt | ............... H01M 8/0662 429/414 |
| 2012/0282533 A1* | 11/2012 | Kim | ....................... B01D 63/02 429/413 |
| 2015/0295255 A1 | 10/2015 | Bae | |

(Continued)

FOREIGN PATENT DOCUMENTS

| | | |
|---|---|---|
| JP | 3927344 B2 | 6/2007 |
| KR | 10-0911593 B1 | 8/2009 |

(Continued)

*Primary Examiner* — Nathanael T Zemui
(74) *Attorney, Agent, or Firm* — Mintz Levin Cohn Ferris Glovsky and Popeo, P.C.; Peter F. Corless

(57) ABSTRACT

Disclosed are a fuel cell system capable of maintaining hydrogen density of the exhaust gas discharged from the fuel cell system at a level below the tolerance limit so that any fears about fire and/or explosion can be dispelled and the safety of the system can be remarkably improved, and a humidifier therefor. The fuel cell system of the present invention comprises a fuel cell stack; and a humidifier configured to (i) humidify an air supplied from outside by means of an off-gas discharged from the fuel cell stack and (ii) supply the humidified air to the fuel cell stack, wherein the off-gas is mixed with at least a portion of the humidified air in the humidifier.

7 Claims, 4 Drawing Sheets

(56) References Cited

U.S. PATENT DOCUMENTS

2016/0036073 A1* 2/2016 Kim .................. H01M 8/04291
 429/414
2017/0250423 A1* 8/2017 Koiwa .............. H01M 8/04141

FOREIGN PATENT DOCUMENTS

| KR | 10-0986473 B1 | 10/2010 |
| KR | 20110063366 A | 6/2011 |
| KR | 10-1059924 B1 | 8/2011 |
| KR | 10-1592423 B1 | 2/2016 |
| KR | 10-1592683 B1 | 2/2016 |
| KR | 10-1748275 B1 | 6/2017 |

\* cited by examiner

FUEL CELL SYSTEM AND HUMIDIFIER THEREFOR

CROSS REFERENCE TO RELATED APPLICATIONS

This application claims the benefit of the Korean Patent Application No. 10-2017-0053447 filed on Apr. 26, 2018, which is hereby incorporated by reference for all purposes as if fully set forth herein.

BACKGROUND OF THE INVENTION

Field of the Invention

The present invention relates to a fuel cell system and a humidifier therefor, and more specifically, to a fuel cell system capable of maintaining hydrogen density of the exhaust gas expelled from the fuel cell system at a level below the tolerance limit so that any fears about fire and/or explosion can be dispelled and the safety of the system can be remarkably improved, and a humidifier therefor.

Discussion of the Related Art

As shown in FIG. 1, a fuel cell system for a fuel cell car which is one of the green cars for the future comprises a fuel cell stack 10 for generating electrical energy along with water through the electrochemical reaction between hydrogen and oxygen. The fuel cell stack 10 comprises a fuel electrode (or anode) 11, an air electrode (or cathode) 12, and a polymer electrolyte membrane 13 therebetween.

The hydrogen gas of high purity stored in a hydrogen tank 21 may be supplied to the fuel electrode 11 of the fuel cell stack 10 by controlling the first valve 22. The unreacted hydrogen which has not electrochemically reacted with oxygen may be discharged from the fuel electrode 11, and then resupplied to the fuel electrode 11 by an ejector 23.

Air in the atmosphere is supplied to the air electrode 12 of the fuel cell stack 10 by an air supplier (not shown) such as a blower.

The hydrogen supplied to the fuel electrode 11 of the fuel cell stack 10 is dissociated into hydrogen ions and electrons. The hydrogen ions move to the air electrode 12 through the polymer electrolyte membrane 13 between the fuel electrode 11 and air electrode 12, and the electrons move to the air electrode 12 through an external wire. The oxygen supplied to the air electrode 12 of the fuel cell stack 10 is combined with the electrons and hydrogen ions to produce water and generate electrical energy as well.

The higher the ion conductivity of the polymer electrolyte membrane 13 of the fuel cell stack 10 is, the better the hydrogen ions can be transferred from the fuel electrode 11 to the air electrode 12. The ion conductivity of the polymer electrolyte membrane 13 is highly related to the moisture content. In other words, the more sufficiently the polymer electrolyte membrane 13 is wet, the better the hydrogen ions can be transferred from the fuel electrode 11 to the air electrode 12.

As such, when the fuel cell system operates, it is necessary to continuously supply the moisture to the polymer electrolyte membrane 13 so as to maintain the moisture content thereof at not lower than a certain level, thereby preventing the generating efficiency of the fuel cell system from deteriorating rapidly. For this purpose, a humidifier 30 capable of providing moisture to the air supplied to the air electrode 12 of the fuel cell stack 10 is adopted.

The humidifier 30 for a fuel cell humidifies the air supplied from the outside with the moisture contained in the off-gas expelled from the air electrode 12 of the fuel cell stack 10, and then supplies the humidified air to the air electrode 12 of the fuel cell stack 10. The off-gas deprived of the moisture for the humidification of the air is expelled from the humidifier 30, and then discharged from the fuel cell system through a separate gas exhauster (not shown).

A portion of nitrogen in the air supplied to the air electrode 12 moves to the fuel electrode 11 through the polymer electrolyte membrane 13. The nitrogen lowers the density and partial pressure of the hydrogen gas at the fuel electrode 11, thereby deteriorating the performance of the fuel cell stack 10. Thus, it is necessary to periodically carry out a purge operation to remove the mixture of the nitrogen and hydrogen gases from the fuel electrode 11.

Since the gas removed from the fuel electrode 11 during the purge operation still includes hydrogen of high density, if it is discharged to the atmosphere as it is, there is a risk that a fire and/or explosion will be caused even by a small spark. For this reason, the density of the hydrogen in the gas removed from the fuel electrode 11 during the purge operation is typically lowered by mixing the gas with the off-gas expelled from the air electrode 12 (i.e., by diluting the purged hydrogen gas with the off-gas) by controlling the second valve 40. The off-gas into which the hydrogen gas has been introduced is supplied to the humidifier 30, deprived of its moisture, and then discharged from the fuel cell system through the exhauster.

Furthermore, when a car is stopped and the operation of the fuel cell system stops, the hydrogen gas of high density remains at the fuel electrode 11 of the fuel cell stack 10 and, as the remaining hydrogen gas of high density diffuses to the air electrode 12 through the polymer electrolyte membrane 13 by lapse of time, there will be the hydrogen gas of high density at the air electrode 12 as well. If, in such situation, the car is started and the operation of the fuel cell system restarts, the off-gas including the hydrogen gas of high density is expelled from the air electrode 12, and then supplied to the humidifier 30.

In sum, when a purge operation is performed at the fuel electrode 11 so as to prevent the decrease of the generating efficiency and/or when a car is restarted after stopped and the fuel cell system restarts, the off-gas including hydrogen is supplied to the humidifier 30, used for the humidification of the air, and then discharged from the fuel cell system through an exhauster.

Generally, if the hydrogen density of the off-gas discharged from the fuel cell system into the atmosphere is higher than 4%, a risk of fire and/or explosion is unavoidable. Therefore, it is a prerequisite for the commercialization of an eco-friendly fuel cell car to guarantee that the density of hydrogen in the off-gas discharged from the humidifier 30 (i.e., the off-gas discharged from the fuel cell system) should be not more than 4%.

SUMMARY OF THE INVENTION

Accordingly, the present invention is directed to a fuel cell system and a humidifier therefor, which substantially obviate one or more problems due to limitations and disadvantages of the related art.

An aspect of the present invention is to provide a fuel cell system capable of maintaining hydrogen density of the exhaust gas discharged from the fuel cell system at a level below the tolerance limit so that any fears about fire and/or explosion can be dispelled and the safety of the system can be remarkably improved.

Another aspect of the present invention is to provide a humidifier for a fuel cell system, which, under whatever circumstances, is capable of maintaining hydrogen density of the exhaust gas discharged from the fuel cell system at a level below the tolerance limit so that any fears about fire and/or explosion can be dispelled and the safety of the system can be remarkably improved.

Additional aspects and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a fuel cell system comprising: a fuel cell stack; and a humidifier configured to (i) humidify an air supplied from outside by means of an off-gas discharged from the fuel cell stack and (ii) supply the humidified air to the fuel cell stack, wherein the off-gas is mixed with at least a portion of the humidified air in the humidifier.

The off-gas may also be mixed with the at least a portion of the humidified air before introduced into the humidifier.

The fuel cell system may further comprise a branch pipe configured to guide the at least a portion of the humidified air to the off-gas discharged from the fuel cell stack and flowing toward the humidifier; and a hydrogen density control valve configured to control open/close of the branch pipe.

In another aspect of the present invention, there is provided a humidifier configured to humidify an air supplied from outside by means of an off-gas discharged from a fuel cell stack and supply the humidified air to the fuel cell stack, the humidifier comprising: a humidifying module having first and second ends; a first cap coupled to the first end, the first cap having an air outlet port for supplying the humidified air to the fuel cell stack; and a second cap coupled to the second end, the second cap having an air inlet port for receiving the air from the outside, wherein the humidifying module comprises: a housing having an off-gas inlet port for receiving the off-gas from the fuel cell stack and an off-gas outlet port for discharging the off-gas; a first fixing layer disposed at one end portion of the housing to isolate an inner space of the housing from an inner space of the first cap; an air tube at least a portion of which is inserted in the first fixing layer, the inner spaces of the housing and first cap being in fluid communication with each other only through the air tube; a second fixing layer disposed at the other end portion of the housing to isolate the inner space of the housing from an inner space of the second cap; and a hollow fiber membrane disposed in the housing, two end parts of the hollow fiber membrane being potted in the first and second fixing layers respectively such that the inner spaces of the first and second caps are in fluid communication with each other only through a lumen of the hollow fiber membrane.

One end part of the air tube may be in the inner space of the first cap.

One end part of the air tube adjoining to the inner space of the first cap may be positioned at a level higher than a maximum level at which a condensed water can be pooled in the inner space of the first cap.

According to the present invention, the hydrogen density of the exhaust gas discharged from the fuel cell system can be maintained at a level not higher than the tolerance limit (4%), so that any fears about fire and/or explosion can be dispelled and the safety of the system can be remarkably improved.

Furthermore, according to an embodiment of the present invention, the hydrogen density of the exhaust gas discharged from the fuel cell system can be maintained at a level not higher than the tolerance limit (4%), even in a severely cold environment.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of a fuel cell system and a humidifier therefor according to the present invention will be described in detail with reference to the accompanying drawings.

Figure 1:
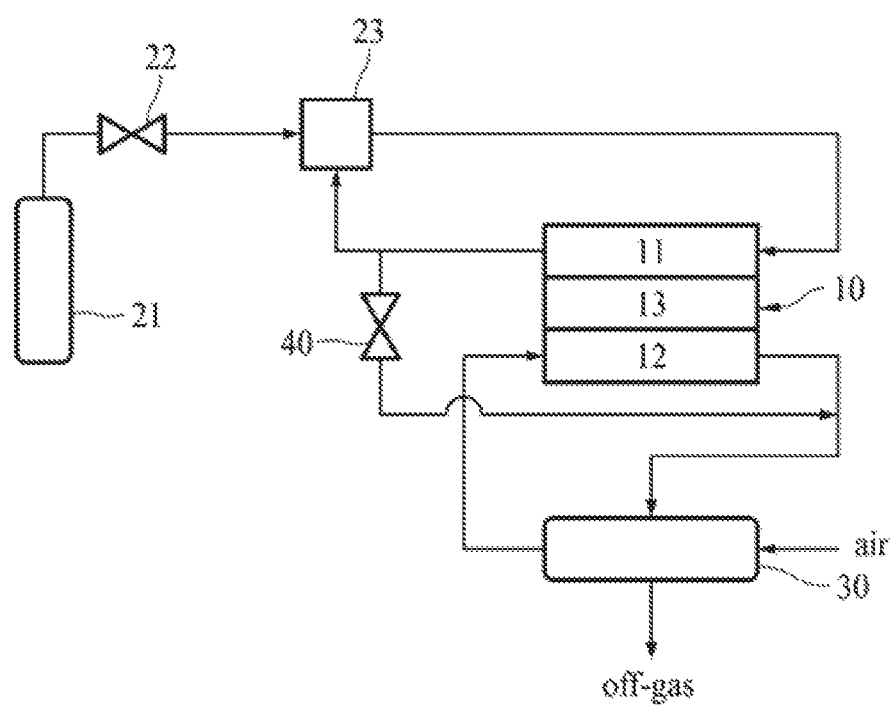
FIG. 1 is a block diagram schematically showing a fuel cell system of the related art.
Figure 2:
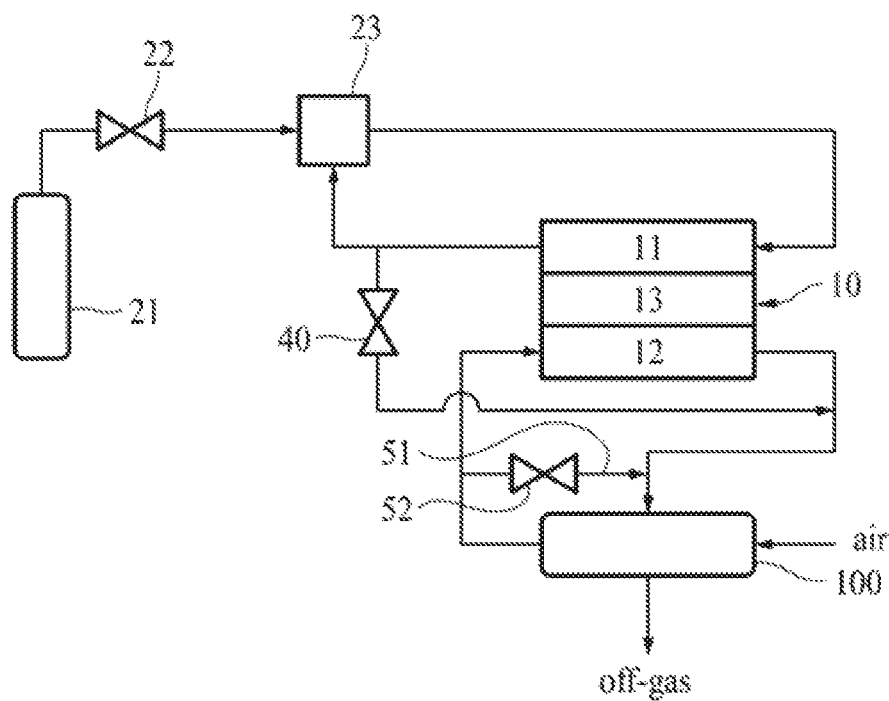
FIG. 2 is a block diagram schematically showing a fuel cell system according to an embodiment of the present invention.

FIG. 2 is a block diagram schematically showing a fuel cell system according to an embodiment of the present invention.

As illustrated in FIG. 2, a fuel cell system according to an embodiment of the present invention comprises a fuel cell stack 10 and a humidifier 100.

The fuel cell stack 10 may comprise a fuel electrode (or, anode) 11, an air electrode (or, cathode) 12, and a polymer electrolyte membrane 13 therebetween.

The hydrogen gas of high purity stored in a hydrogen tank 21 may be supplied to the fuel electrode 11 of the fuel cell stack 10 by controlling the first valve 22. The unreacted hydrogen which has not electrochemically reacted with oxygen may be discharged from the fuel electrode 11, and then resupplied to the fuel electrode 11 by an ejector 23.

Air in the atmosphere is supplied to the air electrode 12 of the fuel cell stack 10 by an air supplier (not shown) such as a blower.

The hydrogen supplied to the fuel electrode 11 of the fuel cell stack 10 is dissociated into hydrogen ions and electrons. The hydrogen ions move to the air electrode 12 through the polymer electrolyte membrane 13 between the fuel electrode 11 and air electrode 12, and the electrons move to the air electrode 12 through an external wire. The oxygen supplied to the air electrode 12 of the fuel cell stack 10 is combined with the electrons and hydrogen ions to produce water and generate electrical energy as well.

The higher the ion conductivity of the polymer electrolyte membrane 13 of the fuel cell stack 10 is, the better the hydrogen ions can be transferred from the fuel electrode 11 to the air electrode 12. The ion conductivity of the polymer electrolyte membrane 13 is highly related to the moisture content. In other words, the more sufficiently the polymer electrolyte membrane 13 is wet, the better the hydrogen ions can be transferred from the fuel electrode 11 to the air electrode 12.

As such, when the fuel cell system operates, it is necessary to continuously supply the moisture to the polymer electrolyte membrane 13 so as to maintain the moisture content thereof at not lower than a certain level, thereby preventing the generating efficiency of the fuel cell system from deteriorating rapidly. For this purpose, the fuel cell system of the present invention further comprises a humidifier 100 capable of providing moisture to the air supplied to the air electrode 12 of the fuel cell stack 10.

The humidifier 100 of the present invention humidifies the air supplied from the outside by means of the moisture contained in the off-gas discharged from the air electrode 12 of the fuel cell stack 10, and then supplies the humidified air to the air electrode 12 of the fuel cell stack 10. The off-gas deprived of the moisture for the humidification of the air is expelled from the humidifier 100, and then discharged from the fuel cell system through a separate gas exhauster (not shown).

The fuel cell system according to an embodiment of the present invention may further comprise the second valve 40 to periodically carry out the purge operation to remove the hydrogen gas, whose purity has been lowered, from the fuel electrode 11. Since the gas removed from the fuel electrode 11 during the purge operation still includes hydrogen of high density, if it is discharged to the atmosphere as it is, there would be a risk of fire and/or explosion. For this reason, the density of the hydrogen may be lowered by mixing the gas removed from the fuel electrode 11 through the purge operation with the off-gas expelled from the air electrode 12 (i.e., by diluting the purged hydrogen gas with the off-gas).

Furthermore, as mentioned above, when a car is stopped and the operation of the fuel cell system stops, the hydrogen of high density remains at the fuel electrode 11 of the fuel cell stack 10 and, as the remaining hydrogen of high density diffuses to the air electrode 12 through the polymer electrolyte membrane 13 by lapse of time, there will be the hydrogen of high density at the air electrode 12 as well. If, in such situation, the car is started and the operation of the fuel cell system restarts, the off-gas including the hydrogen of high density is expelled from the air electrode 12, and then supplied to the humidifier 100.

When a purge operation is performed at the fuel electrode 11 so as to prevent the decrease of the generating efficiency and/or when a car is restarted after stopped and the fuel cell system restarts, the off-gas including hydrogen is supplied to the humidifier 100 of the present invention, used for the humidification of the air, and then discharged from the fuel cell system through the gas exhauster.

As mentioned above, if the hydrogen density of the off-gas discharged out of the fuel cell system is higher than the tolerance limit (4%), there would be a risk of fire and/or explosion. Therefore, a special means is additionally required for the commercialization of an eco-friendly fuel cell car, which can reduce the hydrogen density of the off-gas discharged out of the fuel cell system.

According to the present invention, before discharged out of the fuel cell system, the off-gas discharged from the air electrode 12 of the fuel cell stack 10 is mixed with at least a portion of the air humidified by the humidifier 100 so that the hydrogen density thereof can be reduced.

According to an embodiment of the present invention, the off-gas discharged from the air electrode 12 of the fuel cell stack 10 is mixed with at least a portion of the air humidified by the humidifier 100 before it is introduced into the humidifier 100.

For instance, as illustrated in FIG. 2, the fuel cell system according to an embodiment of the present invention may further comprise (i) a branch pipe 51 configured to guide at least a portion of the humidified air to the off-gas discharged from the fuel cell stack 10 and flowing toward the humidifier 100 and (ii) a hydrogen density control valve 52 configured to control open/close of the branch pipe.

The humidified air does not include hydrogen since it is the air from atmosphere comprising about 80% of nitrogen and about 20% of oxygen that is humidified by the humidifier 100. Accordingly, a portion or most of the humidified air is supplied to the air electrode 12 of the fuel cell stack so as to be used for generating electrical energy, and, at the same time, the rest of the humidified air is mixed with the off-gas discharged from the air electrode 12 of the fuel cell stack 10 so as to be used for reducing the hydrogen density of the off-gas (i.e., for diluting the off-gas). In view of the generating efficiency and safety of the fuel cell system, the proportion of the amount of the humidified air to be supplied to the air electrode 12 of the fuel cell stack 10 to the amount of the humidified air to be used for the dilution of the off-gas could be appropriately selected by a skilled person in this art.

In case of the embodiment of FIG. 2 including the branch pipe 51 and hydrogen density control valve 52, however, there still exist a risk of fire and/or explosion since, due to the malfunction of the hydrogen density control valve 52, the off-gas including hydrogen of high density may be discharged out of the fuel cell system as it is. This would be fatal since safety is the first priority in a car.

Furthermore, when the fuel cell car is driven in severely cold environment, the humidified air flowing along the branch pipe 51 is likely to be condensed and the resulting condensed water may be frozen. If the branch pipe 51 is clogged up as the condensed water is frozen inside the branch pipe 51 (i.e., if the humidified air cannot flow toward the off-gas), the off-gas including hydrogen of high density would be discharged out of the fuel cell system without being diluted with the humidified air, and thus a fire and/or explosion might be caused.

Therefore, additionally or alternatively, the off-gas discharged from the air electrode 12 of the fuel cell stack 10 may be mixed with at least a portion of the humidified air in the humidifier 100.

In other words, according to another embodiment of the present invention, the off-gas discharged from the air electrode 12 of the fuel cell stack 10 may be mixed with at least a portion of the humidified air only in the humidifier 100, or may be mixed with at least a portion of the humidified air before introduced into the humidifier 100 and in the humidifier as well.

Since a portion of the air humidified by the humidifier 100 can be provided, without a valve operation, for the off-gas (including hydrogen of high density) introduced into the humidifier 100, a risk of fire and/or explosion due to the malfunction of a valve can be dispelled.

Additionally, since an air tube (described in detail below) providing a flow path for the humidified air is disposed inside the humidifier 100 and an air buffer exists between the outer layer of the humidifier 100 and the air tube, even in a severely cold environment, the condensed water can be completely prevented from being frozen in the air tube and even the generation of the condensed water can be minimized. Consequently, any fire and/or explosion, which might be caused if the off-gas containing hydrogen of high density is discharged out of the fuel cell system without being diluted with the humidified air due to the condensed water frozen inside the air tube, can be prevented.

Hereinafter, referring to FIGS. 3 to 5, the embodiments of the humidifier according to the present invention configured to provide the off-gas introduced therein with the humidified air will be described in detail.

Figure 3:
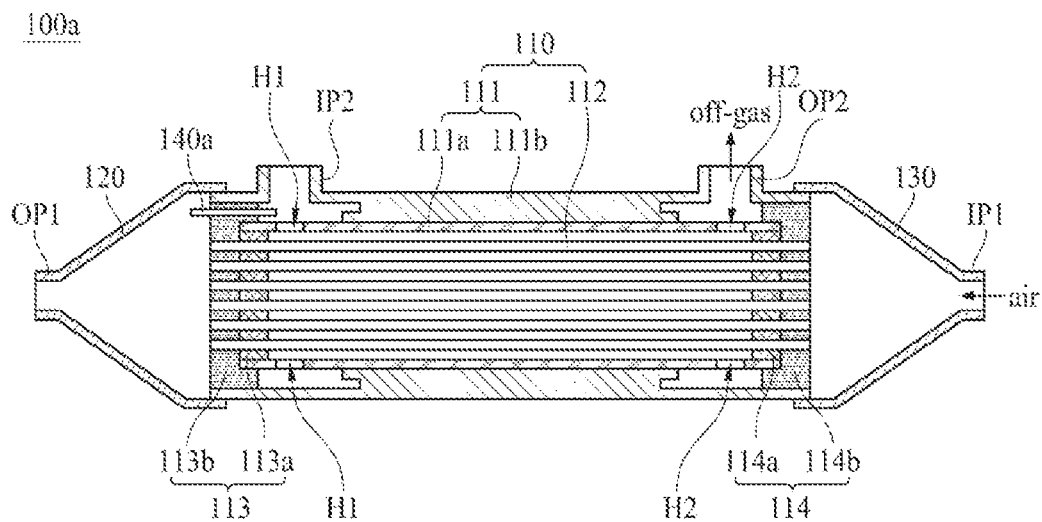
FIG. 3 illustrates a cross section of a humidifier for a fuel cell system according to an embodiment of the present invention.

FIG. 3 illustrates a cross section of a humidifier 100a for a fuel cell system according to one embodiment of the present invention.

As illustrated in FIG. 3, the humidifier 100a according to an embodiment of the present invention comprises a humidifying module 110 having first and second ends, a first cap 120 coupled to the first end, the first cap 120 having an air outlet port OP1 for supplying the humidified air to the fuel cell stack 10 (more specifically, to the air electrode 12 of the fuel cell stack 10), and a second cap 130 coupled to the second end, the second cap 130 having an air inlet port IP1 for receiving the air from the outside.

The humidifying module 110 comprises a housing 111, a first fixing layer 113 disposed at one end portion of the housing 111 to isolate an inner space of the housing 111 from an inner space of the first cap 120, a second fixing layer 114 disposed at the other end portion of the housing 111 to isolate the inner space of the housing 111 from an inner space of the second cap 130, and a plurality of hollow fiber membranes 112 disposed in the housing 111.

The housing 111 has an off-gas inlet port IP2 for receiving the off-gas from the fuel cell stack 10 (more specifically, from the air electrode 12 of the fuel cell stack 10) and an off-gas outlet port OP2 for discharging the off-gas.

Two end parts of each hollow fiber membrane 112 are potted in the first and second fixing layers 113 and 114, respectively, such that the inner spaces of the first and second caps 120 and 130 are in fluid communication with each other only through the lumens of the hollow fiber membranes 112. The inner space of the first cap 120 is defined by the inner surface of the first cap 120 and the first end of the humidifying module 110, and the inner space of the second cap 130 is defined by the inner surface of the second cap 130 and the second end of the humidifying module 110.

As illustrated in FIG. 3, the housing 111 of the present invention may comprise a first housing 111a containing the hollow fiber membranes 112 and a second housing 111b surrounding the first housing 111a, the second housing 111b having the off-gas inlet port IP2 and off-gas outlet port OP2. In this instance, the first housing may have a first group of holes H1 corresponding to the off-gas inlet port IP2 and a second group of holes H2 corresponding to the off-gas outlet port OP2. Further, the two end parts of each hollow fiber membrane 112 may be respectively potted in the first sub-fixing layers 113a and 114a respectively positioned inside the two end portions of the first housing 111a as well as in the second sub-fixing layers 113b and 114b respectively positioned inside the two end portions of the second housing 111b. The two end portions of the first housing 111a may be fixed to the two end portions of the second housing 111b respectively by means of the second sub-fixing layers 113b and 114b. The first sub-fixing layers 113a and 114a and the second sub-fixing layers 113b and 114b may be formed of the same material (e.g., polyurethane) or different material.

While the humidifying module 110 illustrated in FIG. 3 includes only one first housing 111a, the humidifying module 110 of the present invention may include two or more first housings 111a respectively containing the hollow fiber membranes 112, and two end portions of each first housing 111a may be fixed to the two end portions of the second housing 111b respectively by means of the second sub-fixing layers 113b and 114b.

Alternatively, the housing 111 of the present invention may be a single housing containing the hollow fiber membranes 112. In this instance, the two end parts of each hollow fiber membrane 112 may be respectively potted in the fixing layers respectively positioned inside the two end portions of the single housing.

The off-gas discharged from the air electrode 12 of the fuel cell stack 10 is introduced into the housing 111 via the off-gas inlet port IP2, brought into contact with the hollow fiber membranes 112 in the inner space of the housing 111, and then discharged out of the humidifier 100a via the off-gas outlet port OP2.

The air supplied from the outside into the inner space of the second cap 130 via the air inlet port IP1 flows into the inner space of the first cap 120 through the lumens of the hollow fiber membranes 112, and then is supplied to the air electrode 12 of the fuel cell stack 10 via the air outlet port OP1 of the first cap 120.

When the air flows along the lumens of the hollow fiber membranes 112, the moisture contained in the off-gas flowing in the housing 111 penetrates the hollow fiber membranes 112 and joins the air, thereby humidifying the air. The resulting humidified air flows into the inner space of the first cap 120, and then is supplied to the fuel cell stack 10 via the air outlet port OP1 of the first cap 120.

As shown in FIG. 3, the humidifying module 100a according to an embodiment of the present invention further comprises an air tube 140a for providing a bypass through which a portion of the humidified air introduced into the inner space of the first cap 120 flows into the inner space of the housing 111 so that the off-gas introduced into the inner space of the housing 111 can be diluted with the humidified air. The inner space of the housing 111 and the inner space of the first cap 120 are in fluid communication with each other only through the air tube 140a.

According to the present invention, the pressure difference between the inner space of the housing 111 and the inner space of the first cap 120, which occurs when the fuel cell system operates, makes a portion of the humidified air flow into the inner space of the housing 111 through the air tube 140a, thereby making any valve for controlling the flow of the humidified air needless. Thus, the discharge of hydrogen of high density due to the malfunction of such valve and any risk of fire and/or explosion due to such discharge can be avoided.

Furthermore, as illustrated in FIG. 3, at least a portion of the air tube 140a is inserted in the first fixing layer 113, and thus the air tube 140a is not in direct contact with the outer layer of the humidifier 100a (i.e., the first cap 120, housing 111, and second cap 130) and an air buffer exists between the outer layer of the humidifier 100a and the air tube 140a. As such, according to the present invention, even in a severely cold environment, a condensed water can be completely prevented from being frozen in the air tube 140a and even the generation of the condensed water can be minimized. Consequently, any fire and/or explosion, which might be caused if the off-gas containing hydrogen of high density is discharged out of the fuel cell system without being diluted with the humidified air due to the condensed water frozen inside the air tube 140a, can be prevented.

While one end part and the other end part of the air tube 140a may be in the inner spaces of the first cap 120 and housing 111 respectively as shown in FIG. 3, the present invention is not limited thereto and it is possible to make the humidifier 100a in such a way that any part of the air tube 140a is neither in the inner space of the first cap 120 nor in the inner space of the housing 111. Further, it is also possible to make the humidifier 100a in such a way that one end part of the air tube 140a is in the inner space of the first cap 120 while the other part is not in the inner space of the housing. The opposite is also possible.

Alternatively, instead of the air tube 140a which is a separate element, the first fixing layer 113 may have a hole through which the inner space of the first cap 120 and the inner space of the housing 111 are in fluid communication with each other. Therefore, the air tube 140a of the present invention should be interpreted as a term which also includes the hole formed in the first fixing layer 113 for the dilution of the off-gas.

Figure 4:
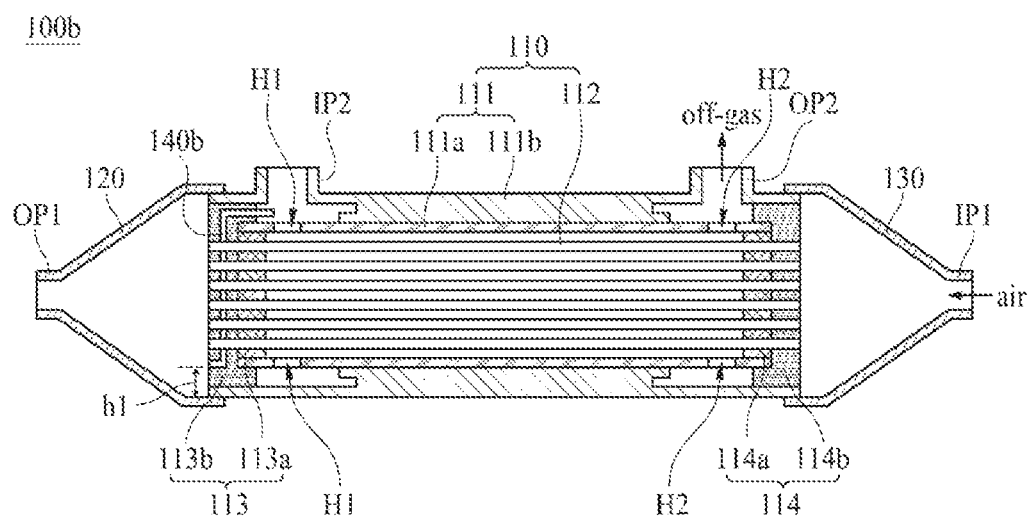
FIG. 4 illustrates a cross section of a humidifier for a fuel cell system according to another embodiment of the present invention.

FIG. 4 shows a cross section of a humidifier 100b according to another embodiment of the present invention. The humidifiers 100a and 100b illustrated in FIGS. 3 and 4 respectively are identical with each other except that the shapes of the air tubes 140a and 140b are different from each other.

As illustrated in FIG. 4, the air tube 140b according to the another embodiment of the present invention may comprise one end part adjoining to the inner space of the first cap 120 and extending substantially parallel to the longitudinal direction of the hollow fiber membranes 112, the other end part adjoining to the inner space of the housing 111 and extending substantially parallel to the longitudinal direction of the hollow fiber membranes 112, and a middle part connecting the both end parts and extending substantially perpendicular to the longitudinal direction of the hollow fiber membranes 112.

While the entire one end part of the air tube 140b may be potted in the first fixing layer 113 as illustrated in FIG. 4, the one end part may also be in the inner space of the first cap 120 as explained above.

If the one end part of the air tube 140b is positioned in or adjoins to the space where the condensed water resulting from the condensation of the humidified air can be pooled, the condensed water rather than the humidified air might flow along the air tube 140b, and thus the off-gas containing hydrogen of high density might be discharged out of the fuel cell system without being diluted with the humidified air, thereby causing a fire and/or explosion.

Thus, according to the another embodiment of the present invention, the one end part of the air tube 140b may be positioned at the level higher than the maximum level at which the condensed water can be pooled in the inner space of the first cap 120. That is, the height h1 of the one end part of the air tube 140b may be larger than the maximum height with which the condensed water can be pooled in the inner space of the first cap 120.

In the present invention, the maximum height with which the condensed water can be pooled in the inner space of the first cap 120 can be determined by assuming the inner space of the first cap 120 is filled with the air (relative humidity: 100%) at 80° C. and 1 bar, calculating the total amount of the condensed water generated by the condensation of the entire air, and determining the maximum height in consideration of the calculated total amount of the condensed water and the size and shape of the inner space of the first cap 120 as well.

Figure 5:
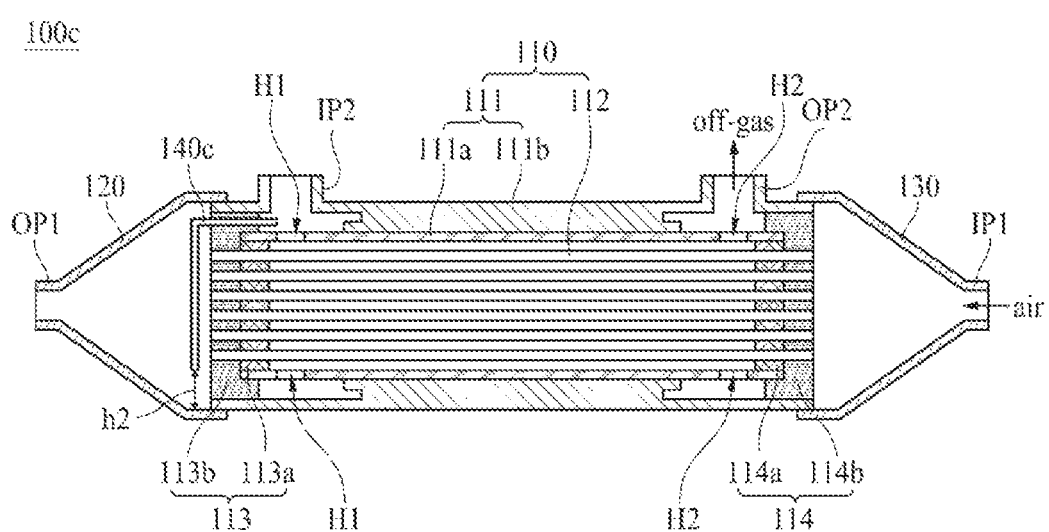
FIG. 5 illustrates a cross section of a humidifier for a fuel cell system according to further another embodiment of the present invention.

FIG. 5 shows a cross section of a humidifier 100c according to still another embodiment of the present invention. The humidifiers 100a and 100c illustrated in FIGS. 3 and 5 respectively are identical with each other except that the shapes of the air tubes 140a and 140c are different from each other.

As illustrated in FIG. 5, one part of the air tube 140c according to the still another embodiment of the present invention is in the inner space of the first cap 120 and extends substantially perpendicular to the longitudinal direction of the hollow fiber membranes 112, and the other part thereof extends substantially parallel to the longitudinal direction of the hollow fiber membranes 112. At least a portion of the other part may be inserted in the first fixing layer 113.

For the same reasons as explained above, the one end part of the air tube 140c in the inner space of the first cap 120 may also be positioned at the level higher than the maximum level at which the condensed water can be pooled in the inner space of the first cap 120. In other words, the height h2 of the one end part of the air tube 140c may also be larger than the maximum height with which the condensed water can be pooled in the inner space of the first cap 120.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A fuel cell system comprising:
 a fuel cell stack; and
 a humidifier configured to (i) humidify an air supplied from outside by means of an off-gas discharged from the fuel cell stack and (ii) supply the humidified air to the fuel cell stack,
 wherein the off-gas introduced into the humidifier is mixed with at least a portion of the humidified air not yet introduced into the fuel cell stack in the humidifier,
 wherein the humidifier includes:
 a humidifying module having first and second ends and a housing with an off-gas inlet port for receiving the off-gas from the fuel cell stack and an off-gas outlet port for discharging the off-gas;
 a first cap coupled to the first end, the first cap having an air outlet port for supplying the humidified air to the fuel cell stack; and
 a second cap coupled to the second end, the second cap having an air inlet port for receiving the air from the outside, wherein a portion of the humidified air introduced into an inner space of the first cap comprises a portion of the off-gas introduced into an inner space of the housing to dilute the humidified air, wherein the humidifying module comprises:

a first fixing layer disposed at one end portion of the housing to isolate the inner space of the housing from the inner space of the first cap; and an air tube at least a portion of which is inserted in the first fixing layer, the inner space of the housing and the inner space of the first cap being in fluid communication with each other only through the air tube, and wherein one end part of the air tube adjoining to the inner space of the first cap is positioned at a level higher than a maximum level at which a condensed water can be pooled in the inner space of the first cap.

2. The fuel cell system of claim 1, wherein the humidifying module further comprises:

a second fixing layer disposed at the other end portion of the housing to isolate the inner space of the housing from an inner space of the second cap; and a hollow fiber membrane disposed in the housing, two end parts of the hollow fiber membrane being potted in the first and second fixing layers respectively such that the inner spaces of the first and second caps are in fluid communication with each other only through a lumen of the hollow fiber membrane.

3. The fuel cell system of claim 2, wherein one end part of the air tube protrudes into the inner space of the first cap.

4. The fuel cell system of claim 1, wherein the off-gas is also mixed with the at least a portion of the humidified air before being introduced into the humidifier.

5. The fuel cell system of claim 4, further comprising:

a branch pipe configured to guide the at least a portion of the humidified air to the off-gas discharged from the fuel cell stack and flowing toward the humidifier; and a hydrogen density control valve configured to control open/close of the branch pipe.

6. A humidifier configured to humidify an air supplied from outside by means of an off-gas discharged from a fuel cell stack and supply the humidified air to the fuel cell stack, the humidifier comprising:

a humidifying module having first and second ends;

a first cap coupled to the first end, the first cap having an air outlet port for supplying the humidified air to the fuel cell stack; and a second cap coupled to the second end, the second cap having an air inlet port for receiving the air from the outside, wherein the humidifying module comprises:

a housing having an off-gas inlet port for receiving the off-gas from the fuel cell stack and an off-gas outlet port for discharging the off-gas;

a first fixing layer disposed at one end portion of the housing to isolate an inner space of the housing from an inner space of the first cap;

an air tube at least a portion of which is inserted in the first fixing layer, the inner spaces of the housing and first cap being in fluid communication with each other only through the air tube;

a second fixing layer disposed at the other end portion of the housing to isolate the inner space of the housing from an inner space of the second cap; and a hollow fiber membrane disposed in the housing, two end parts of the hollow fiber membrane being potted in the first and second fixing layers respectively such that the inner spaces of the first and second caps are in fluid communication with each other only through a lumen of the hollow fiber membrane, wherein one end part of the air tube is in the inner space of the first cap, wherein a portion of the humidified air introduced into the inner space of the first cap comprises a portion of the off-gas introduced into the inner space of the housing to dilute the humidified air, and wherein one end part of the air tube adjoining to the inner space of the first cap is positioned at a level higher than a maximum level at which a condensed water can be pooled in the inner space of the first cap.

7. The fuel cell system of claim 1, wherein the off-gas is also mixed with the at least a portion of the humidified air before being introduced into the humidifier.

* * * * *